Figure 5:
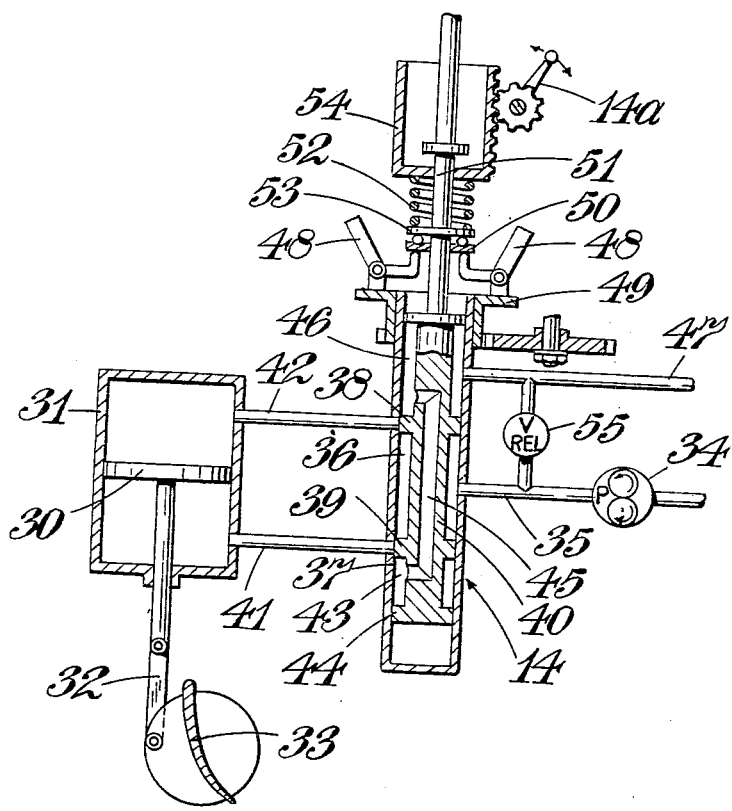

April 10, 1956    A. A. RUBBRA    2,741,087
CONTROL MECHANISM FOR TRANSMITTING A PLURALITY OF CONTROL
MOVEMENTS IN CONTROL SYSTEMS OF COMBUSTION ENGINES
Filed July 17, 1951      2 Sheets-Sheet 1
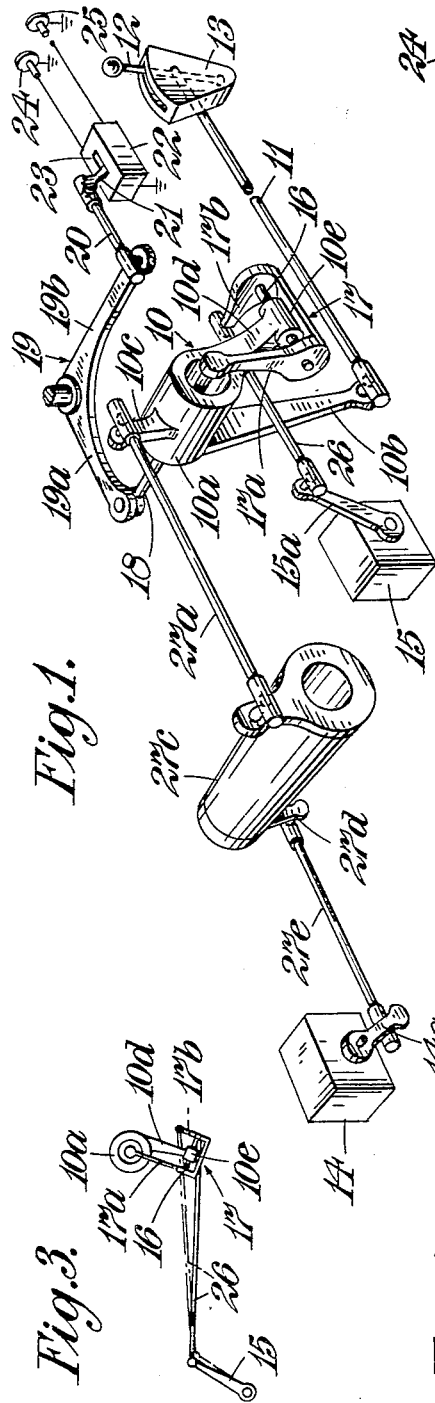
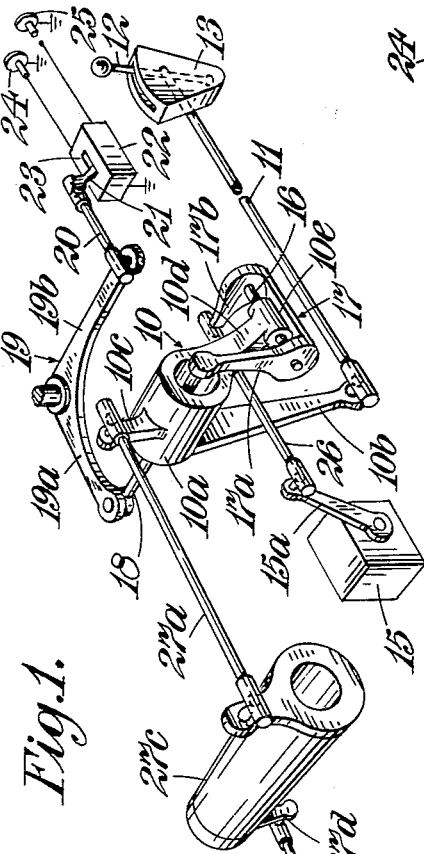
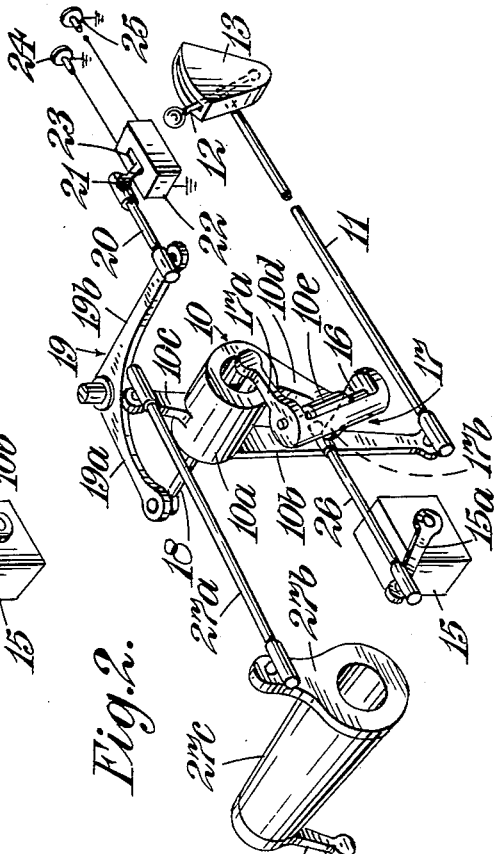
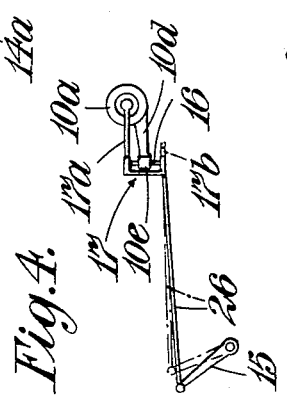
INVENTOR
A. A. RUBBRA
By Wilkinson + Mawhinney
ATTYS.

United States Patent Office 2,741,087
Patented Apr. 10, 1956

2,741,087

CONTROL MECHANISM FOR TRANSMITTING A PLURALITY OF CONTROL MOVEMENTS IN CONTROL SYSTEMS OF COMBUSTION ENGINES

Arthur Alexander Rubbra, Littleover, Derby, England, assignor to Rolls-Royce Limited, Derby, England, a British company Application July 17, 1951, Serial No. 237,158

Claims priority, application Great Britain July 26, 1950

7 Claims. (Cl. 60—39.28)

This invention relates to control systems of gas-turbine engines of the kind having a power output shaft, which, for example, drives an airscrew when the gas-turbine engine is installed in an aircraft.

With such a control system there may be provided a control mechanism by which a control lever is interconnected both with a control valve in the fuel system of the engine and with a speed-controlling device associated with the engine. For example, in such a control system of an airscrew-driving gas-turbine engine, a pilot's control lever may be interconnected both with a control valve for varying the fuel supply to the engine and with the datum-speed-selecting device of a constant-speed unit so as to select the desired rotational speed.

This invention has for an object to provide for a gas-turbine engine, an improved control system of the kind (hereinafter referred to as the kind described) comprising a control valve for controlling the fuel supply to the engine, a speed governor to control the rotational speed of the engine by adjustment of the load on the engine and having a speed-selecting device, and a control lever connected to adjust simultaneously the control valve and the speed-selecting device.

According to this invention a control system of the kind described for a gas-turbine engine comprises means for effecting additional adjustment of the control valve, either manually or automatically, in accordance with an ambient atmospheric air temperature, which means on operation causes substantially no adjustment of the speed-selecting device.

The term ambient atmospheric air temperature includes the air temperature at the air intake to the engine.

According to a feature of this invention, said means is arranged so that the extent of the additional adjustment of the control valve is proportional to the extent of adjustment of the control lever from a given position. It will be appreciated that in this manner the fuel flow to the engine may be varied, on change of ambient air temperature, by an amount proportional to the actual fuel flow determined by the setting of the control lever.

According to another feature of this invention, a control system of the kind described for a gas-turbine engine comprises a rocking lever arranged to be rocked in accordance with movement of the control lever, means adjustable in accordance with an ambient air temperature, a controlling member connected to be actuated by said means to move along the pivotal axis of the rocking lever, a cranked lever which is pivoted to the rocking lever to rock about an axis transverse to and offset from the pivotal axis of the rocking lever and which has a first arm connected to the controlling member to be rocked thereby in accordance with said ambient air temperature and a second arm extending at an angle to the first arm, and a link connected to the control valve and pivoted to the second arm and arranged to move substantially lengthwise of itself and to be substantially parallel, in one angular position of the rocking lever, to the pivotal axis of the cranked lever.

The speed-selecting device of the speed governor may be connected to the rocking lever so as to be adjusted only by movements of the control lever.

In such a control system, it is preferably arranged that, when the control lever is in a position corresponding to idling of the engine, the link connecting the cranked lever with the control valve is substantially parallel to the pivotal axis of the cranked lever, whereby in this position of the control lever the means adjustable in dependence upon the air temperature has no substantial effect on the control valve, and that when the control lever is in a position corresponding to maximum rotational speed, the axis of the cranked lever is substantially at right angles to the link connecting the cranked lever with the control valve whereby said means then has its maximum effect on the control valve. Intermediate these two positions of the control lever, the means to effect additional adjustment in accordance with ambient atmospheric temperature will have an effect on the control valve proportional to the extent of movement of the control lever from its idling position.

The means to effect an additional adjustment in accordance with the ambient atmospheric air temperature may be operated manually or automatically, either directly or through a servo system, and is arranged to reduce the fuel flow for high atmospheric air temperatures as compared with the fuel flow for normal air temperatures.

There will now be described a control linkage between the pilot's control lever of an aircraft gas-turbine engine and a throttle valve for controlling the fuel supply to the gas-turbine engine and the datum-speed-selecting device of the constant speed unit of an airscrew driven by the engine, the description referring to the accompanying drawings in which:

Figure 1 illustrates the control linkage diagrammatically with the parts in the position corresponding to temperate temperature conditions and idling conditions of the engine, Figure 2 is a view corresponding to Figure 1 showing the parts in the positions corresponding to temperate temperature conditions and to maximum rotational speed condition of the engine, Figure 3 is a diagrammatic view illustrating the control effect obtained on adjustment of the temperature adjusted device with the control lever in one extreme position, viz: the position corresponding to idling of the engine, Figure 4 illustrates the control effect obtained on adjustment of the temperature adjusted device with the control lever in its other extreme position, viz: the position corresponding to full throttle operation of the engine, and Figure 5 is a diagrammatic illustration of a constant speed unit such as is commonly employed with engines driving variable pitch airscrews.

The control linkage comprises a first rocking lever generally shown at 10 having a hollow boss 10a, by which the lever is pivotally mounted in fixed structure to rock about the axis of the boss, and three arms 10b, 10c, 10d whereof the first arm 10b is connected by a first input link 11 to the pilot's control lever 12 so that on movement of the pilot's control lever 12 in its gate 13 the first input link 11 moves substantially lengthwise of itself to rock the first lever 10, the second arm 10c is connected by a suitable output linkage 27 to the datum-speed-selecting device 14a of the constant speed unit 14, and the third arm 10d serves to transmit movements of the first lever 10 to the operating lever 15a of the throttle valve 15.

The constant speed unit 14 is of a kind commonly employed in connection with aircraft engines which drive variable pitch propellers and comprises essentially (Figure 5) a servomotor having a piston 30 working in a cylinder 31 and connected by a link 32 to adjust the propeller blades 33 in pitch, and a servo pressure fluid supply controlled by an engine-driven governor. The pressure fluid is usually supplied by an engine-driven pump 34 from which the pressure fluid passes by pipeline 35 into a first space 36 of a piston valve cylinder 37, the space 36 being between a pair of lands 38, 39 on the piston valve 40. The pressure fluid is conveyed from the piston valve cylinder 37, to the servomotor cylinder 31 through pipes 41 and 42 according to the position of adjustment of the piston valve 40. With the piston valve 40 in the position illustrated no pressure fluid reaches the servo motor cylinder 31 and the piston 30 is held in a fixed position; with the piston valve 40 raised from the position illustrated so as to uncover pipe 42 to the space 36 pressure fluid passes to the upper end of cylinder 31 to move the piston 30 downwardly, and the return fluid flows through pipe 41 into the space 43 between land 39 and a further land 44 and thence through a duct 45 into a return space 46 leading to a return pipe 47; with the piston valve 40 lowered from the position illustrated the pipe 41 is connected to the space 36 and so pressure fluid is supplied to the lower end of the servomotor cylinder 31 raising the piston 30, the return fluid flowing through the pipe 42 into space 46 and thence to pipe 47.

The position of the piston valve is controlled by a spring 52 bearing on a flange 53 on a stem 51 upstanding from the piston valve 40 and by governor weights 48 which are mounted on a member 49 driven at a speed proportional to the engine speed and which bear through a thrust bearing 50 on the flange 53. The spring 52 opposes the effect of the governor weights 48 and has an adjustable abutment 54 the position of which is set by the datum-speed-selecting device 14a.

It will be clear that as the datum-speed-selecting device is moved to increase the load of spring 52 a higher rotational speed is selected. Furthermore, it will be clear that with the datum-speed-selecting device 14a in any given position, an unwanted increase in rotational speed causes the piston valve 40 to be raised and the servo motor to be operated to coarsen the pitch of the airscrew blades and thus increase the load on the engine and bring back the engine speed to the selected value. Conversely on occurrence of an unwanted decrease in speed, the spring 52 causes the piston valve 40 to be lowered and the servomotor 30, 31 operated to fine-off the airscrew blades 33 thus reducing the load on the engine and permitting the engine to speed up.

A relief valve 55 is provided to prevent pressure in pipe 35 exceeding a selected value.

The linkage 27 is illustrated as comprising link 27a, radius arm 27b, cross-shaft 27c which is pivotally mounted in fixed structure, radius arm 27d and link 27e.

The third arm 10d has at its end a boss 10e through which extends a pivot pin 16 the axis of which is at right angles to the pivotal axis of the first lever 10. Mounted to rock on the pivot pin 16 is a cranked lever 17 comprising a pair of arms 17a, 17b which are at right angles to one another and which are spaced apart so as to be one on each side of the boss 10e of the third arm 10d.

The first arm 17a of the cranked lever 17 is connected to a second input link 18 which extends through the hollow boss 10a of the first lever 10 substantially coaxially with the pivotal axis of the first lever 10. The second input link 18 is arranged to be displaced lengthwise of itself and thus along the pivotal axis of the first lever 10, and means is provided to move the link 18 between two positions, one of which positions corresponds to tropical operation of the engine and the other of which positions corresponds to operation of the engine under temperate conditions. It will be appreciated that on movement of the second input link 18 lengthwise of itself, the cranked lever 17 is caused to rock about the pivot pin 16.

The means for moving the link 18 is illustrated as comprising a bell-crank lever 19 whereof one arm 19a is pivoted to the link 18 and the second arm 19b is connected by a link 20 to a two-position lever 21, which is arranged to rock and move along slot 23 from one end to the other. The lever 21 may, for instance, be rocked under control of an electric motor the supply current to which and the direction of rotation of which is selected to determine the end of the slot towards which the lever moves by operating one or the other of two switches 24, 25. Under temperate conditions switch 24 is closed, switch 25 open and the lever 21 is caused to take up the position shown in Figures 1 and 2, and under tropical conditions switch 25 is closed, switch 24 is open and the lever 21 is at the opposite end of slot 23 which may for instance be formed in a housing 22 for the electric motor. The switches 24, 25 may be manually operated as shown in Figures 1 and 2, or they may be automatically operated as described below.

The second arm 17b of the cranked lever 17 is connected by a link 26 to the throttle-valve-operating lever 15a and this link is so disposed that when the pilot's control lever 12 is in the idling position in its gate 13 (Figures 1 and 3), the link 26 is substantially parallel or makes only a small angle to the pivot pin 16 for the cranked lever 17.

The pilot's control lever 12 is also given such a range of movement in the gate 13 and the velocity ratios of the levers are so selected that when the pilot's control lever 12 is in a position in its gate corresponding to maximum rotational speed of the engine and airscrew (Figures 2 and 4), the arm 10d of the first lever 10 is rocked to a position in which the pivot pin 16 for the cranked lever 17 extends substantially at right angles or at a large angle to the link 26 connecting the second arm 17b of the cranked lever 17 to the throttle-valve-operating lever 15a.

The second input link 18 is connected to the cranked lever 17 through a universal connection, and similar connections are provided between the second arm 17b of the cranked lever 17 and the link 26 and also between this link 26 and the throttle-valve-operating lever 15a. A similar connection may also be provided between the first input link 11 and the first lever 10, and between the second arm 10c of this lever and the link 27a.

With the control linkage above described, when the pilot's control lever 12 is in the idling position (Figures 1 and 3) in its gate 13 and thus the link 26 between the second arm 17b of the cranked lever 17 and the throttle-valve lever 15a is substantially parallel to the pivot pin 16 of the cranked lever 17, displacement of the second input link 18 lengthwise of itself and thus along the axis of the first lever 10 although causing rocking of the cranked lever 17 causes no substantial displacement of the link 26 between the cranked lever 17 and the throttle valve lever 15a. This effect is illustrated in Figure 3 and is due to the fact that with this position of the pilot's control lever 12 the end of the second arm 17b of the cranked lever 17 to which the throttle-valve lever 15a is connected, moves along a line substantially at right angles to the link 26 joining the cranked lever 17 and the throttle-valve lever 15a.

When, however, the pilot's control lever 12 is in the maximum rotational speed position in its gate (Figures 2 and 4), movement of the second input link 18 along the axis of the first lever 10 causes a movement of the end of the second arm 17b of the cranked lever 17 along a line substantially parallel to the length of the link 26 joining the cranked lever 17 and the throttle valve lever 15a and so effects a substantial adjustment of the throttle valve lever 15a (see Figure 4). For positions of the pilot's control lever 12 between the idling position (Figures 1 and 3) and the maximum rotational speed position (Figures 2 and 4), the extent of adjustment of the throttle-valve lever 15a due to movements of the second input link 18 varies according to the position of the pilot's control lever 12 and increases as the pilot's control lever 12 is moved from the idling position to the maximum-rotational-speed position.

The movements of the second input link 18 lengthwise of itself have no effect on the position of the first lever 10, so that the intake-air temperature control has no controlling effect on the position of the datum-speed-selecting device 14a of the constant speed unit 14. The datum-speed-selecting device 14a of the constant speed unit 14 is adjusted solely by movement of the pilot's control lever 12, which movements are transmitted to the datum-speed-selecting device through the first lever 10.

The manually-operated switches 24, 25 described above may be replaced by automatically-operated switches which are operated in accordance with the ambient atmospheric air temperature. Such automatic switches may be, for example, of the type in which a capsule subjected to the ambient air temperature contains an expansible liquid or vapour, and is connected to a Bourdon tube, capsule stack or the like connected to operate the switch contacts. Alternatively the automatic switches may be operated by an electrical temperature-sensitive circuit of any convenient kind.

Briefly stated, therefore, with the control linkage above described, movement of the pilot's control lever 12 causes a proportionate and simultaneous movement of the throttle valve lever 15a and of the datum-speed-selecting device 14a, and the temperature-operated mechanism 19—25 displaces the second input link 18 to effect a trimming action on the setting of the throttle-valve lever 15a to reduce the fuel supply when the engine is operating under tropical conditions. The extent to which the reduction is effected is dependent on the position of the pilot's control lever 12 in its gate 13, increasing as the control lever is moved from the idling position towards the maximum power position.

With this mechanism it is possible to avoid exceeding the maximum permissible jet-pipe temperature during hot weather or in tropical climate conditions without the pilot having to adjust the pilot's control lever 12, and thereby reducing the rotational speed of the engine.

I claim:

1. A control system comprising a throttle valve for controlling a supply of fuel to a gas-turbine engine, a speed governor to control the rotational speed of the engine by adjustment of the load on the engine, said governor having a speed-selecting device, a control lever, a linkage connecting said control lever to the throttle valve and the speed-selecting device for simultaneous adjustment and comprising a rocking lever arranged to be rocked in accordance with movement of the control lever, a controlling member arranged to move along the rocking axis of the rocking lever, a temperature control connected to move said controlling member along said rocking axis, a cranked lever which is pivoted to the rocking lever to rock about an axis transverse to and offset from the rocking axis of the rocking lever and which has a first arm connected to the controlling member to be rocked thereby in accordance with the movement of the controlling member along the rocking axis of the rocking lever and a second arm extending at an angle to the first arm, and a link connected to the throttle valve and pivoted to the second arm and arranged to move substantially lengthwise of itself and to be parallel in one angular position of the rocking lever to the pivotal axis of the cranked lever.

2. A control system as claimed in claim 1, having the link which connects the cranked lever with the throttle valve, arranged in one position of the rocking lever as set by the control lever to extend substantially parallel to the pivotal axis of the cranked lever, whereby in this position of the control lever movement of the controlling member effects no substantial adjustment of the throttle valve, and also arranged in a second position of the rocking lever as set by the control lever to extend substantially at right angles to the axis of the cranked lever whereby movement of said controlling member has its maximum effect on the adjustment of the throttle valve.

3. A control system as claimed in claim 1, wherein said temperature control is arranged for manual setting.

4. A control system as claimed in claim 1 having the temperature control arranged for automatic adjustment in accordance with ambient atmospheric temperature and by its adjustment to effect a corresponding movement of the controlling member.

5. A control system as claimed in claim 1, wherein said temperature control comprises a lever, means to move said lever from a position representative of low operating temperatures to a second position representative of high temperature operating conditions, and manual selecting means to control actuation of said means to move said lever thereby to select the position of adjustment of said lever.

6. A control system for use with a gas-turbine engine comprising a throttle valve for controlling a fuel supply to the engine, said throttle valve being adjustable between a maximum flow position and a minimum flow position, a speed governor to control the rotational speed of the engine by adjustment of the load on the engine and having a speed-selecting device, said speed-selecting device being adjustable between a maximum speed position and a minimum speed position, a manually-settable control lever, said control lever being adjustable between a maximum speed setting and minimum speed setting, adjusting means adjustable between a first position corresponding to a first ambient atmospheric temperature condition and a second position corresponding to a second and higher ambient atmospheric temperature condition, a first linkage interconnecting said control lever and said adjusting means and said throttle valve to set the throttle valve in accordance with the positions of the control lever and said adjusting means and arranged when said adjusting means is in said first position and said control lever is at said maximum speed setting to locate said throttle valve in said maximum flow position and also arranged when said adjusting means is in said second position and said control lever is at said maximum speed setting to locate said throttle valve in a position intermediate said maximum flow position and said minimum flow position, and a second linkage interconnecting said control lever and said speed-selecting device and arranged on movement of said control lever from said minimum speed setting to said maximum speed setting to effect corresponding movement of said speed-selecting device from said minimum speed position to said maximum speed position, whereby on movement of the control lever the throttle valve and speed-selecting device are set simultaneously and on movement of said adjusting means from said first position to said second position the position of the speed-selecting device corresponding with each setting of the control lever is substantially unaffected and the position of the throttle valve is varied to permit a lesser fuel flow for each setting of the control lever above the minimum speed setting.

7. A control system for use with a gas turbine engine comprising a throttle valve for controlling a fuel supply to the engine, a speed governor to control the rotational speed of the engine by adjustment of the load on the engine and having a speed-selecting device, a manually-operable control lever, adjusting means adapted for movement between a number of positions each of which represents a corresponding ambient atmospheric temperature, and a mechanical linkage interconnecting said adjusting means, said throttle valve, said speed governor and said control lever and including a first linkage interconnecting the control lever with the throttle valve and the speed-selecting device to permit simultaneous and proportionate adjustment of the throttle valve and the speed-selecting device on adjustment of said control lever, and a second linkage interconnecting the throttle valve and the adjusting means to adjust said throttle valve in accordance with movement of said adjusting means, and independently of the adjustment effected by movement of the control lever, while causing substantially no adjustment of the speed-selecting device.

References Cited in the file of this patent

UNITED STATES PATENTS

| | | |
|---|---|---|
| 2,350,781 | Lichte | June 6, 1944 |
| 2,396,618 | Stieglitz et al. | Mar. 12, 1946 |
| 2,500,618 | Pugh et al. | Mar. 14, 1950 |
| 2,536,158 | Chamberlain | Jan. 2, 1951 |
| 2,538,582 | Mordell et al. | Jan. 16, 1951 |
| 2,638,992 | Lundquist | May 19, 1953 |